United States Patent
Horitani et al.

(10) Patent No.: US 11,506,531 B2
(45) Date of Patent: Nov. 22, 2022

(54) WEIGHING MECHANISM WITH A WATERPROOF COVER TO PROTECT A DIAPRAGM SEAL

(71) Applicant: Ishida Co., Ltd., Kyoto (JP)

(72) Inventors: Yoshiki Horitani, Ritto (JP); Mikio Kishikawa, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 133 days.

(21) Appl. No.: 17/196,229

(22) Filed: Mar. 9, 2021

(65) Prior Publication Data

US 2021/0293608 A1    Sep. 23, 2021

(30) Foreign Application Priority Data

Mar. 18, 2020    (JP) .............................. JP2020-047331

(51) Int. Cl.
*G01G 19/393*  (2006.01)
*G01G 23/00*   (2006.01)
*G01G 21/23*   (2006.01)
*G01G 21/22*   (2006.01)

(52) U.S. Cl.
CPC .......... *G01G 23/00* (2013.01); *G01G 19/393* (2013.01); *G01G 21/22* (2013.01); *G01G 21/23* (2013.01)

(58) Field of Classification Search
CPC .... G01G 19/387; G01G 19/393; G01G 21/22; G01G 21/23; G01G 23/00; G01G 21/28
See application file for complete search history.

(56) References Cited

U.S. PATENT DOCUMENTS

| | | | | |
|---|---|---|---|---|
| 5,038,875 A | * | 8/1991 | Kitagawa | G01G 21/28 177/180 |
| 6,188,029 B1 | * | 2/2001 | Miyamoto | G01G 19/393 251/303 |
| 6,674,021 B2 | * | 1/2004 | Tanaka | G01G 13/18 177/25.18 |
| 6,703,568 B2 | * | 3/2004 | Wako | G01G 19/393 177/180 |

FOREIGN PATENT DOCUMENTS

EP    3392629 A1    10/2018
JP    2018-179869 A    11/2018

* cited by examiner

*Primary Examiner* — Randy W Gibson
(74) *Attorney, Agent, or Firm* — Studebaker & Brackett PC (57) ABSTRACT

A weighing mechanism (1) includes: a hopper (105) configured to store an article; a hanger (2) on which the hopper is hung; a mass weighing instrument (3) configured to weigh the article stored in the hopper; a connection member (4) that connects the hanger and the mass weighing instrument; a main body member (6) having a through hole (5) through which the connection member penetrates; a diaphragm (7) that connects an outer edge of the connection member and an inner edge of the through hole of the main body member; and a waterproof cover (8) that covers at least part of the through hole between the diaphragm and the hanger. The waterproof cover is detachably attached only to the hanger among the main body member and the hanger.

8 Claims, 6 Drawing Sheets

WEIGHING MECHANISM WITH A WATERPROOF COVER TO PROTECT A DIAPRAGM SEAL

CROSS-REFERENCE TO RELATED APPLICATION

This application is based upon and claims the benefit of priority from Japanese Patent Application No. 2020-047331 filed on Mar. 18, 2020 in Japan, the entire contents of which are incorporated herein by reference.

TECHNICAL FIELD

The present invention relates to a weighing mechanism for weighing an article.

BACKGROUND ART

JP 2018-179869 A describes a weighing mechanism including a hopper that stores an article, a mass weighing instrument that weighs the article stored in the hopper, a connection member that connects the hanger on which the hopper is hung and the mass weighing instrument, and a main body member having a through hole through which the connection member penetrates. The hopper and the hanger are disposed outside the main body member of the weighing mechanism, and the mass weighing instrument is disposed inside the main body member of the weighing mechanism. In the weighing mechanism configured in this way, a diaphragm is used to waterproof the space between the outer edge of the connection member and the inner edge of the through hole of the main body member in order to prevent water from entering from the outside to the inside of the weighing mechanism.

SUMMARY OF THE INVENTION

Technical Problem

The weighing mechanism configured in this way is required to be cleaned regularly in order to remove debris and the like of the article. The cleaning may be performed with high pressure water using a high pressure washer. Cleaning with high pressure water could damage the rubber diaphragm. Further, in order to protect the diaphragm, it is conceivable to provide a waterproof cover. However, when the waterproof cover is provided, maintenance may be complicated.

Therefore, a weighing mechanism that has a diaphragm, and that can protect the diaphragm while suppressing complicated maintenance is provided.

Solution to Problem

The weighing mechanism (1) according to an aspect includes a hopper (105) configured to store an article, a hanger (2) on which the hopper is hung, a mass weighing instrument (3) configured to weigh the article stored in the hopper, a connection member (4) that connects the hanger and the mass weighing instrument, a main body member (6) having a through hole (5) through which the connection member penetrates, and a diaphragm (7) that connects an outer edge of the connection member and an inner edge of the through hole of the main body member. The weighing mechanism includes a waterproof cover (8) that covers at least part of the through hole between the diaphragm and the hanger. The waterproof cover is detachably attached only to the hanger among the main body member and the hanger. The waterproof cover is provided between the diaphragm and the hanger, and the waterproof cover can cover at least part of the through hole. Therefore, it is possible to prevent the high pressure water from directly hitting the diaphragm and prevent the diaphragm from being damaged. Further, the waterproof cover is not attached to the main body member, but is detachably attached only to the hanger. Therefore, the waterproof cover can be attached and detached without disassembling the hanger and the main body member. Therefore, the diaphragm can be protected while suppressing complicated maintenance.

According to a preferred embodiment, the waterproof cover and the hanger are connected via a boss (10) extending from the hanger toward the through hole. According to this embodiment, since the waterproof cover and the hanger are connected via the boss, the position of the waterproof cover can be disposed close to the through hole. Therefore, it is possible to prevent water from entering the diaphragm through the through hole and further protect the diaphragm.

According to a preferred embodiment, the waterproof cover is divided into a plurality of cover components (81, 82), and the cover components are each attachable to and detachable from the hanger. According to this embodiment, since the cover components each can be attachable to and detachable from, the operation of attaching and detaching the waterproof cover can be performed more easily. Further, even when the cover component is damaged or deteriorated, only the cover component can be replaced.

According to a preferred embodiment, an inclined portion (11) inclined toward the hanger is provided at the lower end portion of the waterproof cover in the vertical direction. According to this embodiment, since the lower end portion of the waterproof cover is inclined toward the hanger, water at the time of cleaning can be guided toward the hanger instead of the through hole. Therefore, it is possible to prevent water or the like from entering the through hole and further protect the diaphragm.

DESCRIPTION OF EMBODIMENTS

Hereinafter, a weighing mechanism 1 according to the first embodiment will be described with reference to the drawings. In the following description of the drawings, the same or similar parts are denoted by the same or similar reference symbols. However, note that the drawings are schematic, and ratios of dimensions may be different from actual ones. Therefore, specific dimensions and the like are determined in consideration of the following description. Moreover, there may be portions where dimensional relationships or proportions are different among the drawings.

Figure 1:
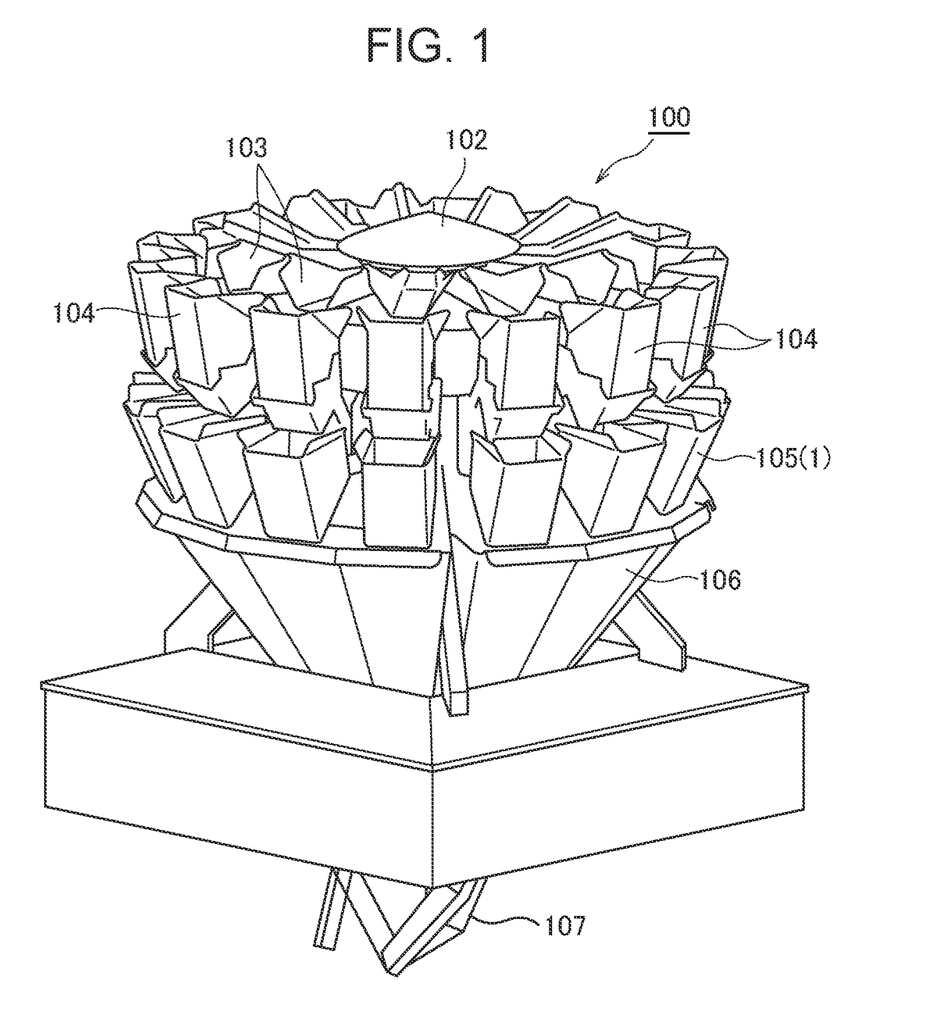
FIG. 1 is a schematic view of a combination weighing instrument.

The weighing mechanism 1 may be a weighing mechanism 1 included in a combination weighing instrument 100. FIG. 1 is an overall perspective view of the combination weighing instrument 100. The combination weighing instrument 100 may include a supply chute 101, a distribution table 102, a radiation feeder 103, a pool hopper 104, a weighing hopper 105, a collection chute 106, and a timing hopper 107.

The combination weighing instrument 100 weighs and transports an article as an object to be weighed. The article is, for example, food. The article is charged into the supply chute 101, and the article charged into the supply chute 101 is supplied to the distribution table 102. The distribution table 102 may transport the articles while distributing them. The distribution table 102 supplies articles to a plurality of radiation feeders 103 disposed around the distribution table 102. Each of the radiation feeders 103 transports the article supplied from the distribution table 102 to the pool hopper 104 provided corresponding to each radiation feeder 103.

The article supplied to each pool hopper 104 may be delivered to the weighing hopper 105 located below the pool hopper 104. The weighing hopper 105 is disposed at the downstream side of the supply mechanism and temporarily stores the article to weigh the article. The combination weighing calculation may be performed based on the weighing value of the article weighed by the weighing hopper 105. A combination of articles whose combination weighing calculation result is within a predetermined allowable range and which is closest to the target value may be selected. The article, in the weighing hopper 105, included in the selected combination may be discharged to the collection chute 106. The collection chute 106 collects articles discharged from a plurality of weighing hoppers 105. The articles discharged to the collection chute 106 may be supplied to the timing hopper 107. The timing hopper 107 may supply articles to, for example, a packaging machine installed at a later stage of the weighing mechanism 1. The weighing hopper 105 constitutes a "hopper in the weighing mechanism" of the present invention.

Figure 2:
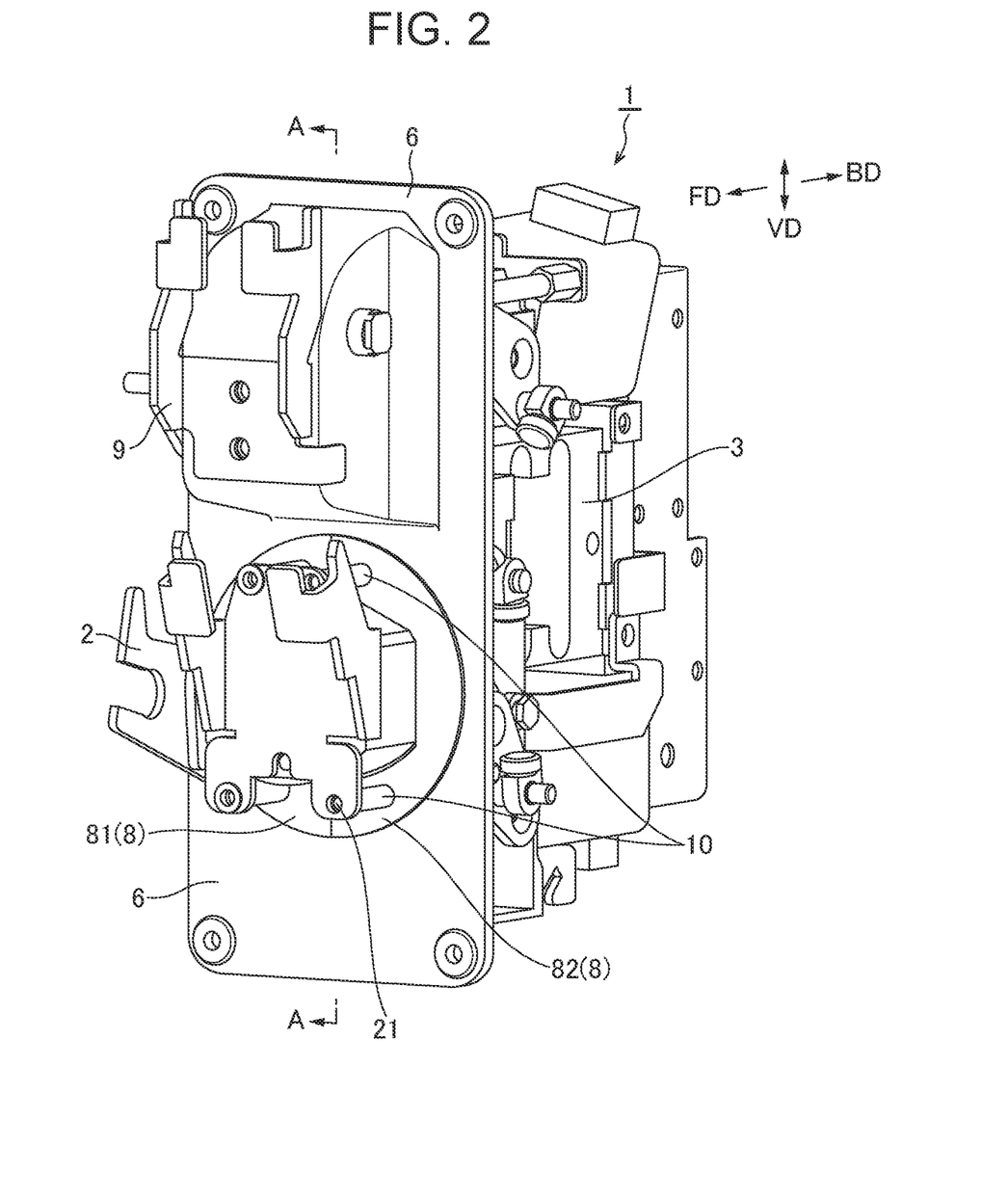
FIG. 2 is a perspective view showing part of a weighing mechanism according to the first embodiment.
Figure 3:
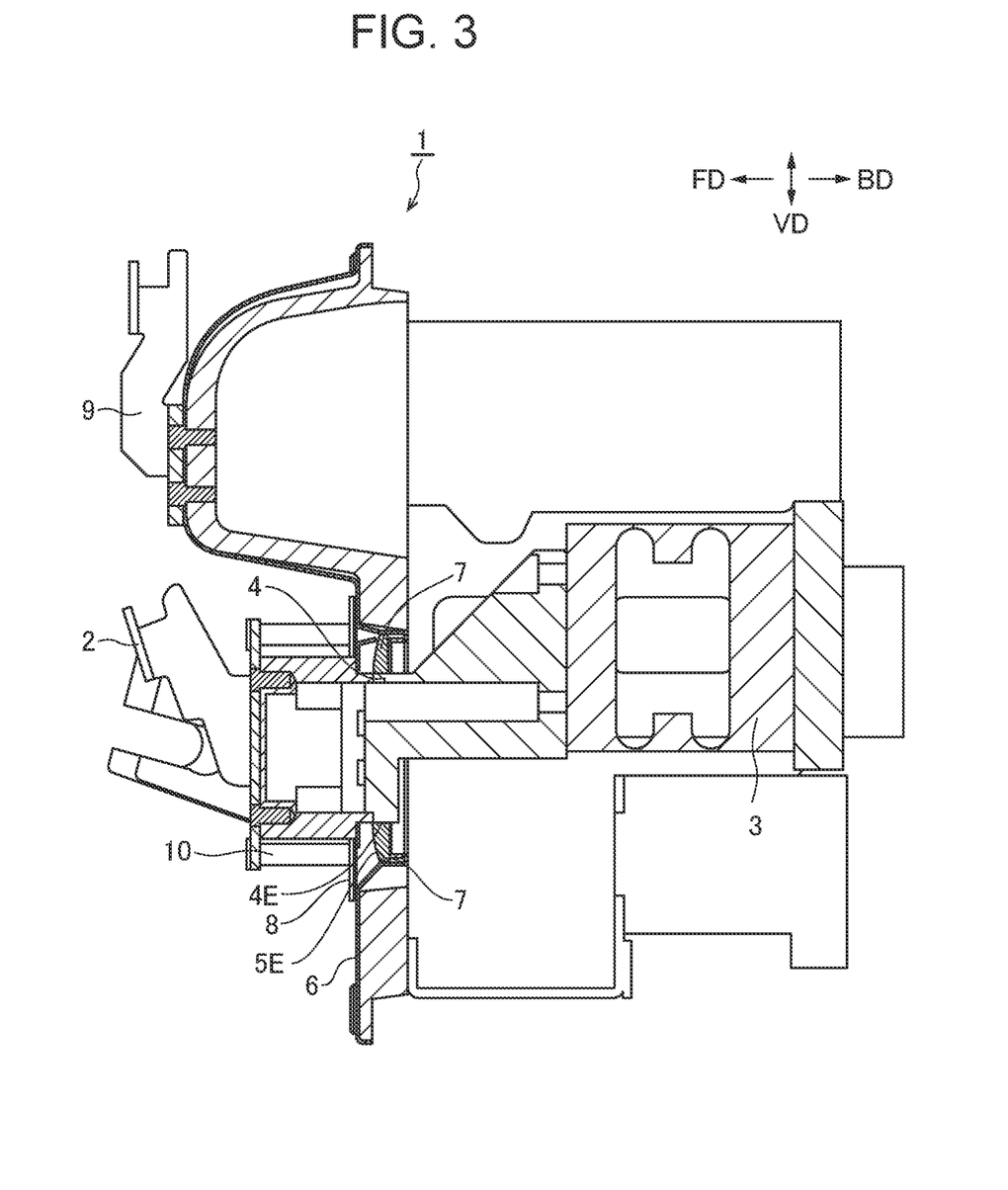
FIG. 3 is a cross-sectional view taken along line A-A shown in FIG. 2.
Figure 4:
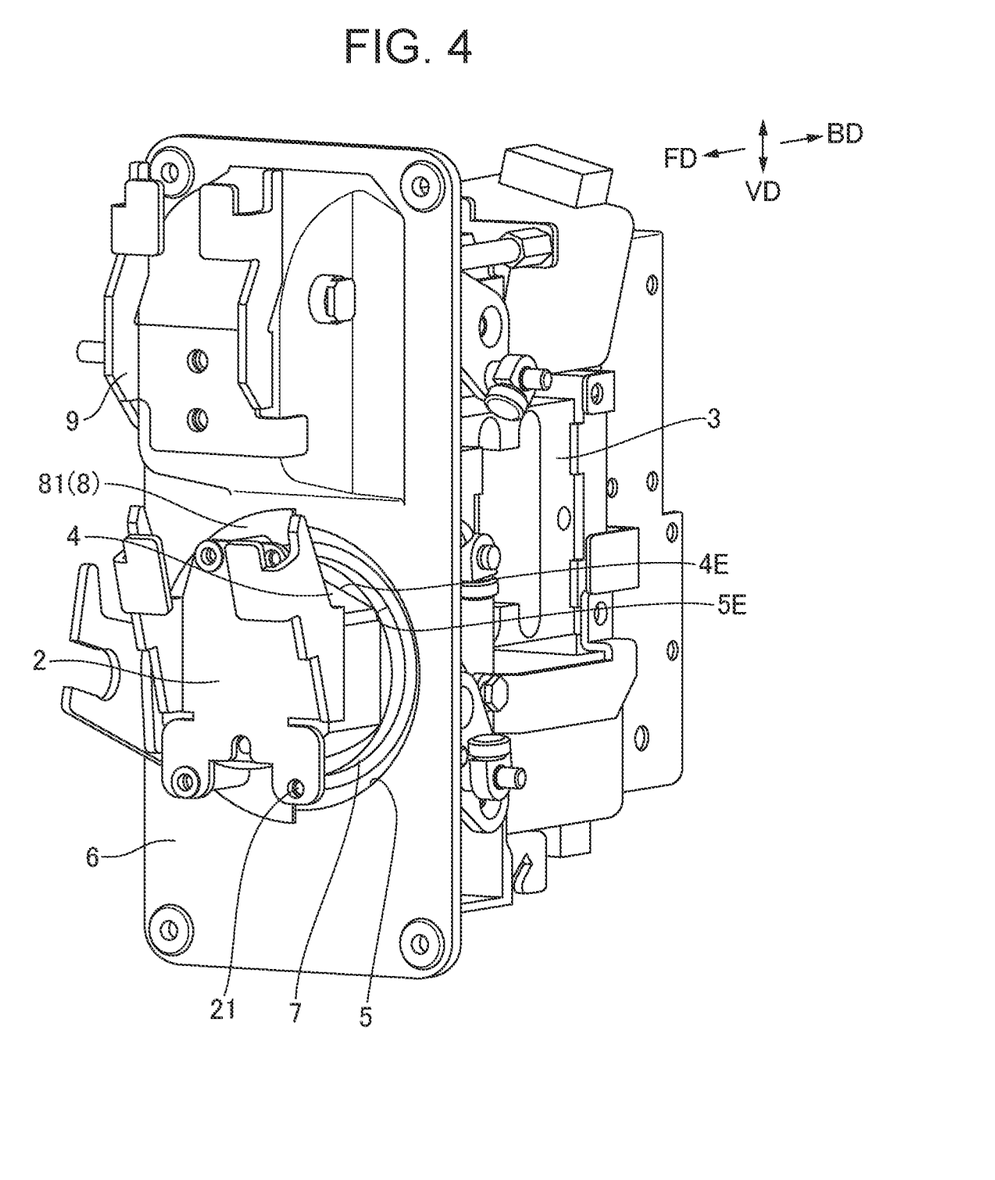
FIG. 4 is a perspective view showing part of the weighing mechanism according to the first embodiment.

Next, the weighing mechanism 1 according to the first embodiment will be described in detail with reference to FIGS. 2 to 4. FIG. 2 is a perspective view showing part of the weighing mechanism 1. More specifically, in FIG. 2, the weighing hopper 105 in the weighing mechanism 1 shown in FIG. 1 is omitted. FIG. 3 is a cross-sectional view taken along line A-A shown in FIG. 2. FIG. 4 is a perspective view showing part of the weighing mechanism according to the first embodiment. More specifically, FIG. 4 is a diagram in which part of a plurality of cover components is omitted from the weighing mechanism 1 shown in FIG. 2.

The weighing mechanism 1 includes the weighing hopper 105, a weighing hopper hanger 2 on which weighing hopper 105 is hung, a mass weighing instrument 3 that weighs the article stored in the weighing hopper 105, a connection member 4 that connects the weighing hopper hanger 2 and the mass weighing instrument 3, a main body member 6 having a through hole 5 through which the connection member 4 penetrates, and a diaphragm 7 that connects an outer edge 4E of the connection member 4 and an inner edge 5E of the through hole 5 of the main body member 6. The weighing hopper hanger constitutes a "hanger in the weighing mechanism" of the present invention.

The main body member 6 is a substantially rectangular member when viewed from the front, and has the through hole 5 through which the connection member 4 penetrates. The through hole 5 is circular. The weighing hopper hanger 2 and a pool hopper hanger 9 may be disposed outside the main body member 6 of the combination weighing instrument 100. The pool hopper hanger 9 is a hanger on which the pool hopper 104 is hung, and is disposed above the weighing hopper hanger 2. The weighing mechanism 1 may not have the pool hopper hanger 9.

The weighing hopper 105 is hung on the weighing hopper hanger 2. The weighing hopper hanger 2 is connected to the mass weighing instrument 3 via the connection member 4. The connection member 4 is disposed inside the through hole 5. When an object to be weighed is charged into the weighing hopper 105, the mass weighing instrument 3 is distorted. The mass weighing instrument 3 is configured so that the mass value of the object to be weighed charged into the weighing hopper 105 can be detected based on a signal based on such strain.

As shown in FIG. 4 and the like, the diaphragm 7 connects the outer edge 4E of the connection member 4 and the inner edge 5E of the through hole 5 of the main body member 6. The diaphragm 7 is made of a flexible material such as rubber, a thermoplastic resin, or a fluororesin, and maintains the airtightness between the outer edge 4E of the connection member 4 and the inner edge 5E of the through hole 5 of the main body member 6. The diaphragm 7 is configured to prevent water from entering from the outside to the inside of the weighing mechanism 1.

The weighing mechanism 1 has a waterproof cover 8. The waterproof cover 8 covers at least part of the through hole 5 between the diaphragm 7 and the weighing hopper hanger 2. Therefore, when cleaning is performed with high pressure water using a high pressure washer, it is possible to prevent high pressure water from directly hitting diaphragm 7, and damage to the diaphragm 7 can be prevented. As shown in FIGS. 3 and 4, the waterproof cover 8 of the present embodiment covers the inner edge 5E of the through hole 5, and straddles the inner edge 5E in the radial direction of the through hole 5. According to this configuration, the waterproof cover 8 can further suppress the intrusion of water from the inner edge 5E of the through hole 5 into the weighing mechanism 1.

Further, the waterproof cover 8 is detachably attached only to the weighing hopper hanger 2 among the main body member 6 and the weighing hopper hanger 2. That is, the waterproof cover 8 is not attached to the main body member 6, but is detachably attached only to the weighing hopper hanger 2. When the waterproof cover 8 is attached to both the main body member 6 and the weighing hopper hanger 2, it is necessary to disassemble the main body member 6 and the weighing hopper hanger 2 when the waterproof cover 8 is removed, and maintenance work may be complicated. However, since the waterproof cover 8 is attached to and detached from only the weighing hopper hanger 2, the waterproof cover 8 can be attached and detached without disassembling the weighing hopper hanger 2 and the main body member 6. Therefore, the diaphragm 7 can be protected while suppressing the complexity of maintenance.

The waterproof cover 8 and the weighing hopper hanger 2 may be connected via a boss 10 extending from the weighing hopper hanger 2 toward the through hole 5. The boss 10 extends from the main body member 6 side face of the weighing hopper hanger 2 toward the back direction RD of the weighing mechanism 1. The waterproof cover 8 is in contact with the main body member 6 side face of the boss 10. According to this embodiment, since the waterproof cover 8 and the weighing hopper hanger 2 are connected via the boss 10, the position of the waterproof cover is close to the through hole 5 by the axial length of the boss 10. Therefore, the position of the waterproof cover 8 can be disposed close to the through hole 5. It is possible to further prevent water from entering the diaphragm 7 through the through hole 5, and to further protect the diaphragm 7. A plurality of bosses 10 may be disposed at intervals in the vertical direction, and may be disposed at intervals in the left-right direction. According to this configuration, the positioning of the weighing hopper hanger 2 and the waterproof cover 8 can be stabilized via the boss 10.

The weighing hopper hanger 2 may have a fastening hole portion 21 into which a fastening member (bolt or the like) for connecting the boss 10 and the waterproof cover 8 is inserted. The fastening hole portion 21 is disposed in front face of the weighing hopper hanger 2 and penetrates toward the back direction RD. The boss 10 may be disposed on the fastening hole portion 21 in the back direction RD, and the waterproof cover 8 may be disposed on the boss 10 in the back direction RD. The fastening member that attaches the waterproof cover 8 to the weighing hopper hanger 2 may be configured to be attached from the outside (front direction FD) of the weighing hopper hanger 2. More specifically, with the boss 10 and the waterproof cover 8 disposed on the weighing hopper hanger 2 in the back direction RD (main body member 6 side), it is possible to insert the fastening member into the fastening hole portion 21 from the front direction FD of the weighing hopper hanger 2, and fasten the weighing hopper hanger 2, the boss 10 and the waterproof cover 8. According to this configuration, the waterproof cover 8 and the boss 10 can be attached/detached from the front side of the weighing hopper hanger 2.

The boss 10 and the waterproof cover 8 may be joined in advance, or the boss 10 and the waterproof cover 8 may be fastened together to the weighing hopper hanger 2. Also, according to the configuration in which the boss 10 and the waterproof cover 8 are fastened together to the weighing hopper hanger 2, the boss 10 and the waterproof cover 8 can be integrated and attached to the weighing hopper hanger 2, so that the operability of the attachment/detachment operation of the waterproof cover 8 can be further improved.

The waterproof cover 8 may be divided into a plurality of cover components. In the present embodiment, the waterproof cover 8 is divided into two parts, a first cover component 81 and a second cover component 82. The first cover component 81 and the second cover component 82 are disposed side by side when viewed from the front. FIG. 4 shows the state where the first cover component 81 located on the left side when viewed from the front is attached, and the second cover component 82 located on the right side when viewed from the front is removed. The cover components 81 and 82 each may be attachable to and detachable from the weighing hopper hanger 2. That is, a fastening member that detachably connects the first cover component 81 to the weighing hopper hanger 2 and a fastening member that detachably connects the second cover component 82 to the weighing hopper hanger 2 may be provided. Since each of the cover components can be attachable to and detachable from, the operation of attaching and detaching the waterproof cover can be performed more easily. Further, even when the cover component is damaged or deteriorated, only the cover component can be replaced. The number of cover components is not limited to two, and may be three or more.

In the embodiment, a case where the mass weighing instrument 3 is connected only to the weighing hopper 105 is described as an example. As mentioned above, the "hopper" of the present invention is configured by the weighing hopper 105, and the "hanger" of the present invention is configured by the weighing hopper hanger 2. However, the present invention is not limited to this case, but it can be applied to a case where the mass weighing instrument is connected not only to the weighing hopper 105 but also another hopper (for example, a pool hopper). In the another case, the "hopper" of the present invention may be configured by the pool hopper 104, and the "hanger" of the present invention may be configured by the pool hopper hanger 9.

Figure 5:
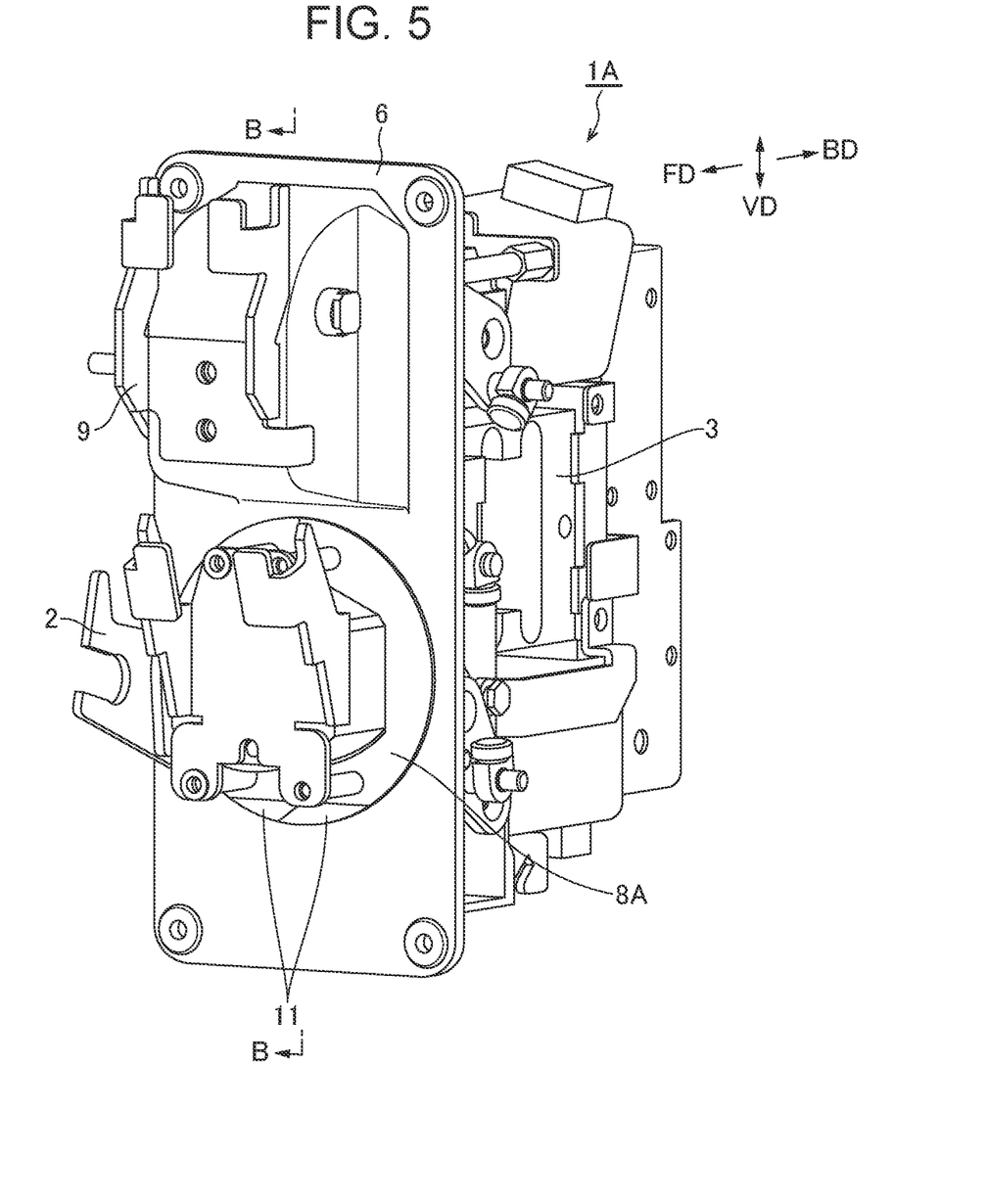
FIG. 5 is a perspective view showing part of a weighing mechanism according to the second embodiment.
Figure 6:
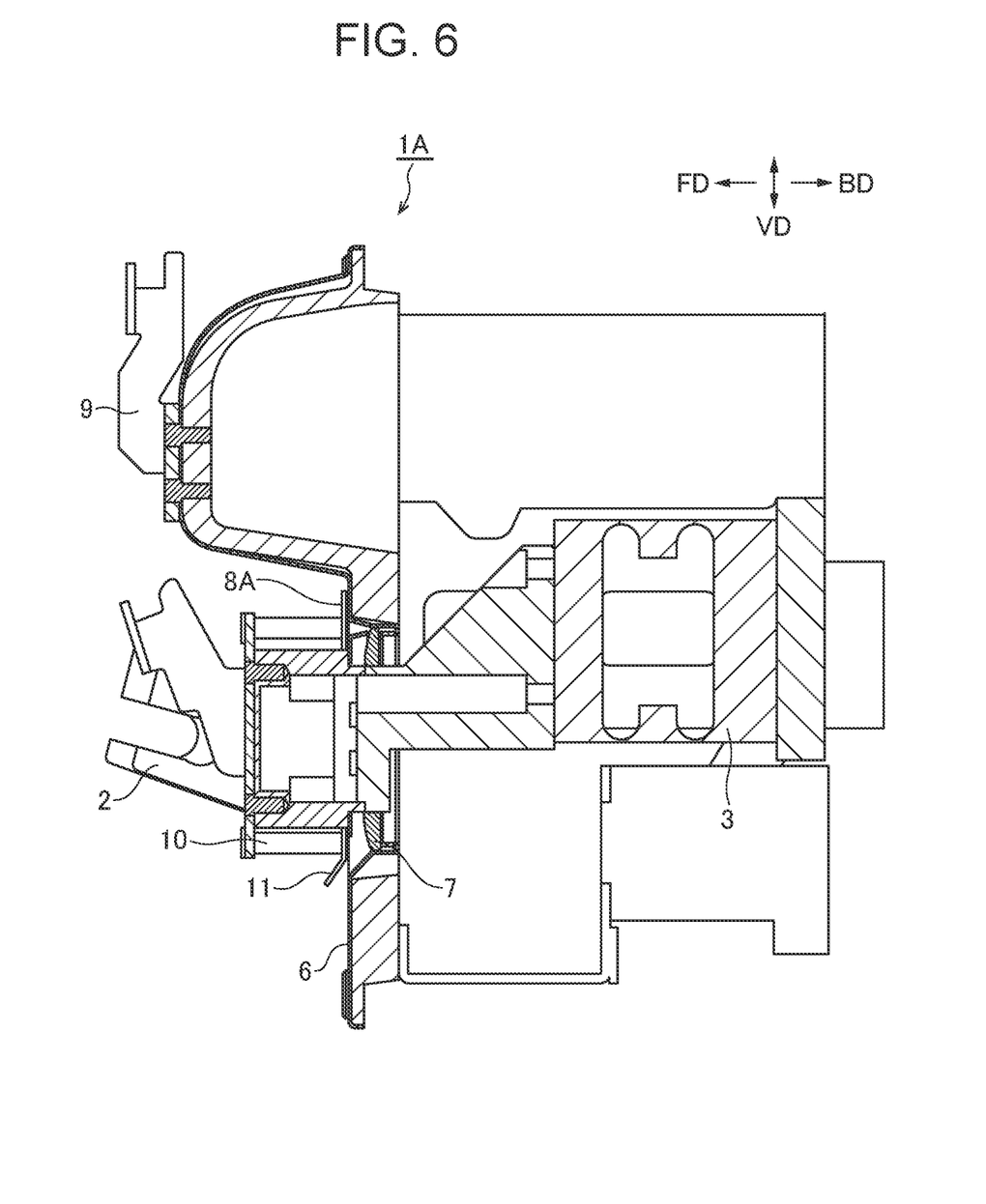
FIG. 6 is a cross-sectional view taken along line B-B shown in FIG. 5.

Next, the weighing mechanism 1A according to the second embodiment will be described with reference to FIGS. 5 and 6. A weighing mechanism 1A according to the second embodiment is different from the weighing mechanism 1 according to the first embodiment in a waterproof cover 8A. Since the other configurations are the same as those in the first embodiment, the same reference numerals are used and the description thereof will be omitted. The waterproof cover 8A of the second embodiment has an inclined portion 11 at the lower end portion of the waterproof cover in the vertical direction. The inclined portion 11 is inclined vertically downward toward the weighing hopper hanger 2 (front direction FD). Since the lower end portion of the waterproof cover 8A is inclined toward the weighing hopper hanger 2, water at the time of cleaning can be guided toward the weighing hopper hanger 2 instead of the through hole 5. Therefore, it is possible to prevent water or the like from entering the through hole 5 and further protect the diaphragm 7.

The upper end of the inclined portion 11 may be located below the center of the waterproof cover in the vertical direction VD, and the lower end of the inclined portion 11 may reach the lower end of the waterproof cover 8. The upper end of the inclined portion 11 may be located below the lower end of the through hole 5. That is, the through hole 5 and the inclined portion 11 may not overlap when viewed from the front. According to the configuration, as shown in FIG. 6, the through hole 5 and the waterproof cover 8 are disposed in parallel, and the space between the through hole 5 and the waterproof cover 8 is not widened, so that it is difficult for water the through hole 5 to enter as compared with the configuration in which the through hole 5 and the inclined portion 11 overlap when viewed from the front.

As mentioned above, although the present invention is explained in detail using the above-mentioned embodiments, it will be apparent to those skilled in the art that the present invention is not limited to the embodiments described herein. The present invention can be implemented as modifications and changes without departing from the spirit and scope of the present invention defined by the description of the claims. Accordingly, the description of the present specification is for the purpose of illustration and is not intended to limit the present invention in any way.

REFERENCE SIGNS LIST

1, 1A weighing mechanism
2 weighing hopper hanger (hunger)
3 mass weighing instrument
4 connection member
4E outer edge
5 through hole
5E inner edge
6 main body member
7 diaphragm
8, 8A waterproof cover
10 boss
11 inclined portion
81, 82 cover component
105 weighing hopper (hopper)

What is claimed is:

1. A weighing mechanism comprising:
a hopper configured to store an article;
a hanger on which the hopper is hung;
a mass weighing instrument configured to weigh the article stored in the hopper;
a connection member that connects the hanger and the mass weighing instrument;
a main body member having a through hole through which the connection member penetrates;
a diaphragm that connects an outer edge of the connection member and an inner edge of the through hole of the main body member; and
a waterproof cover that covers at least part of the through hole between the diaphragm and the hanger, wherein
the waterproof cover is detachably attached only to the hanger among the main body member and the hanger.

2. The weighing mechanism according to claim 1, wherein
the waterproof cover and the hanger are connected via a boss extending from the hanger toward the through hole.

3. The weighing mechanism according to claim 1, wherein
the waterproof cover is divided into a plurality of cover components, and
the cover component is attachable to and detachable from the hanger.

4. The weighing mechanism according to claim 2, wherein
the waterproof cover is divided into a plurality of cover components, and
the cover component is attachable to and detachable from the hanger.

5. The weighing mechanism according to claim 1, wherein
an inclined portion inclining toward the hanger is provided at a lower end portion of the waterproof cover in a vertical direction.

6. The weighing mechanism according to claim 2, wherein
an inclined portion inclining toward the hanger is provided at a lower end portion of the waterproof cover in a vertical direction.

7. The weighing mechanism according to claim 3, wherein
an inclined portion inclining toward the hanger is provided at a lower end portion of the waterproof cover in a vertical direction.

8. The weighing mechanism according to claim 4, wherein
an inclined portion inclining toward the hanger is provided at a lower end portion of the waterproof cover in a vertical direction.

* * * * *